United States Patent
Stansberry et al.

(10) Patent No.: US 9,369,554 B2
(45) Date of Patent: Jun. 14, 2016

(54) KEY HOLDER—CELL PHONE HOLDER COMBINATION

(71) Applicants: Juanita Stansberry, Evanston, IL (US); Ronald Stansberry, Evanston, IL (US)

(72) Inventors: Juanita Stansberry, Evanston, IL (US); Ronald Stansberry, Evanston, IL (US)

( * ) Notice: Subject to any disclaimer, the term of this patent is extended or adjusted under 35 U.S.C. 154(b) by 0 days.

(21) Appl. No.: 14/805,844

(22) Filed: Jul. 22, 2015

(65) Prior Publication Data
US 2016/0036948 A1 Feb. 4, 2016

Related U.S. Application Data

(60) Provisional application No. 62/030,762, filed on Jul. 30, 2014.

(51) Int. Cl.
*H04M 1/00* (2006.01)
*H04M 1/04* (2006.01)
*H04M 1/02* (2006.01)
*H04M 1/03* (2006.01)
*H04M 1/66* (2006.01)

(52) U.S. Cl.
CPC .............. *H04M 1/04* (2013.01); *H04M 1/0214* (2013.01); *H04M 1/0264* (2013.01); *H04M 1/03* (2013.01); *H04M 1/66* (2013.01)

(58) Field of Classification Search
CPC ........... A45C 2001/026; A45C 11/321; A45C 2011/002; A45C 2013/1061; A45F 2005/006; A45F 2200/0516; H04B 1/385; H04B 1/3888
USPC ...................................................... 455/575.6
See application file for complete search history.

(56) References Cited

U.S. PATENT DOCUMENTS

| | | | | |
|---|---|---|---|---|
| 4,951,819 A * | 8/1990 | Gebert | ................. | A45C 11/329 206/37.2 |
| 5,511,390 A * | 4/1996 | Mah | ....................... | A44C 25/00 206/37.1 |
| 6,148,993 A * | 11/2000 | Chisolm | .................. | A45C 1/02 206/37.4 |
| 7,637,218 B1 * | 12/2009 | Burton | ..................... | A45C 9/00 108/43 |
| 8,031,078 B1 * | 10/2011 | Liestman | ............. | G08B 15/004 340/573.1 |
| 2007/0087794 A1 * | 4/2007 | Choi | ...................... | A45C 11/38 455/575.6 |
| 2007/0222592 A1 * | 9/2007 | Zelman | ................... | G08B 21/24 340/539.32 |
| 2009/0023484 A1 * | 1/2009 | Macklin | ................. | A45C 11/00 455/575.6 |
| 2009/0180715 A1 * | 7/2009 | Wittke-Kothe | ........... | A45F 4/02 383/4 |
| 2013/0190053 A1 * | 7/2013 | Kelly | ....................... | A45F 5/00 455/566 |

* cited by examiner

*Primary Examiner* — Simon Nguyen
(74) *Attorney, Agent, or Firm* — Justin Lampel

(57) ABSTRACT

A key holder cell phone holder combination is provided. The key holder cell phone holder has a looped strap having a first end and a second end wherein the first end passes through a first and a second central opening on the main body of the cell phone holder. The looped strap is secured to a standard key ring on the second end. When the first end of the looped strap is pulled away from the main body of the cell phone holder, the second end having the standard ring key and keys is pulled inward, toward an interior pocket of the cell phone holder. A plurality of pockets located on the cell phone holder allow for storing money, IDs, credit cards and other personal items.

6 Claims, 5 Drawing Sheets

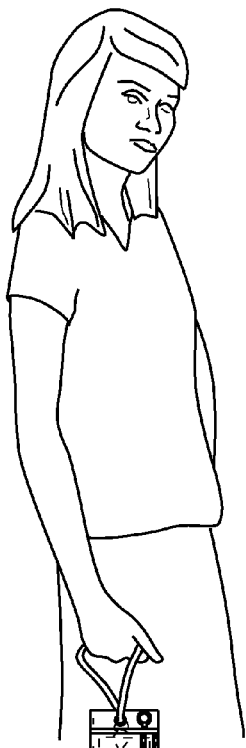
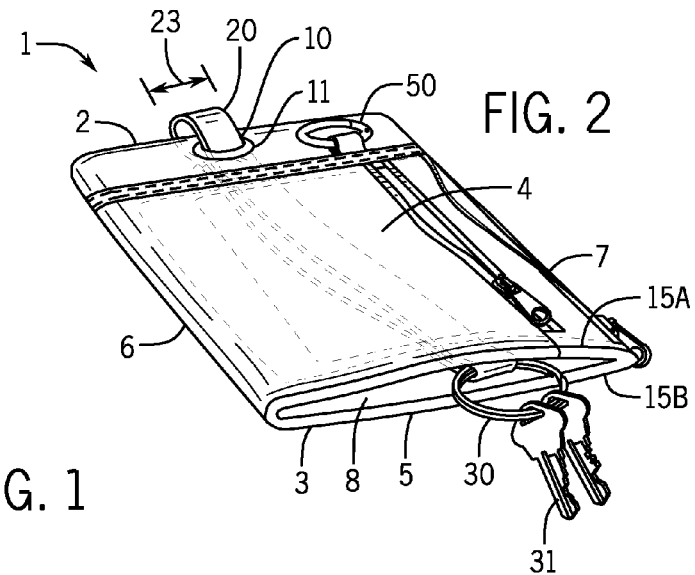
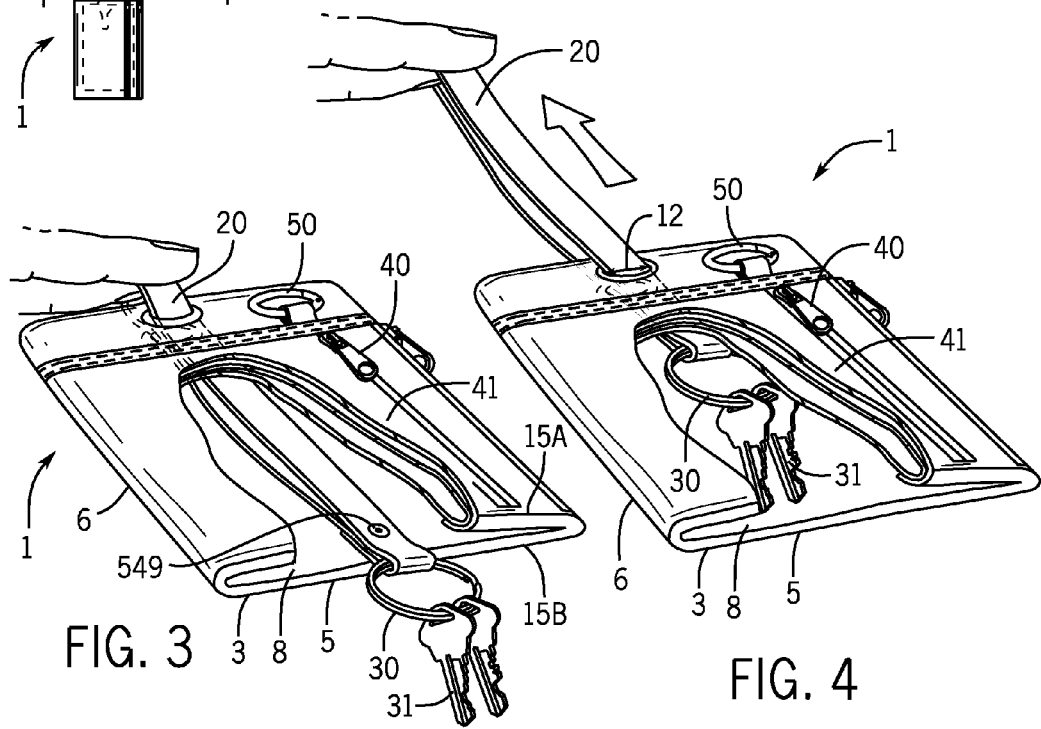

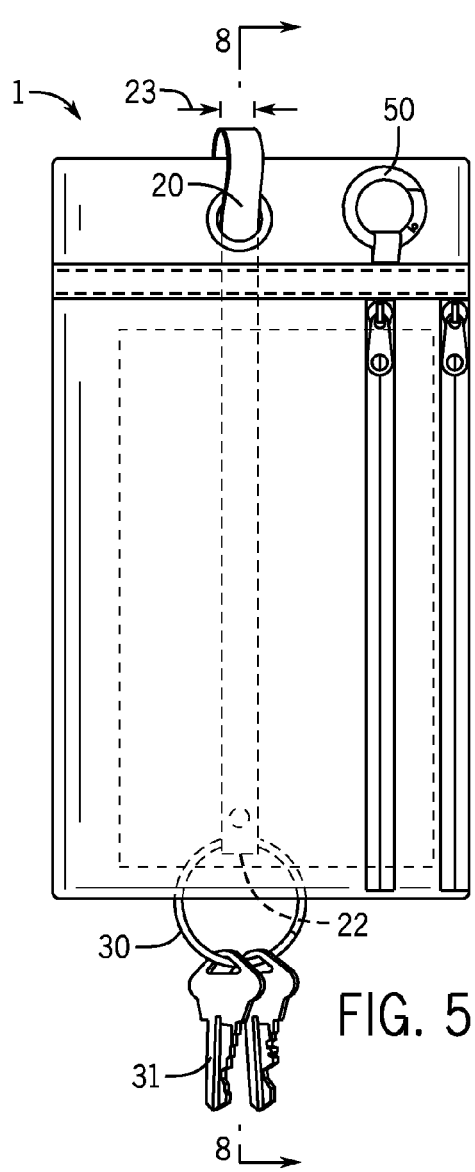
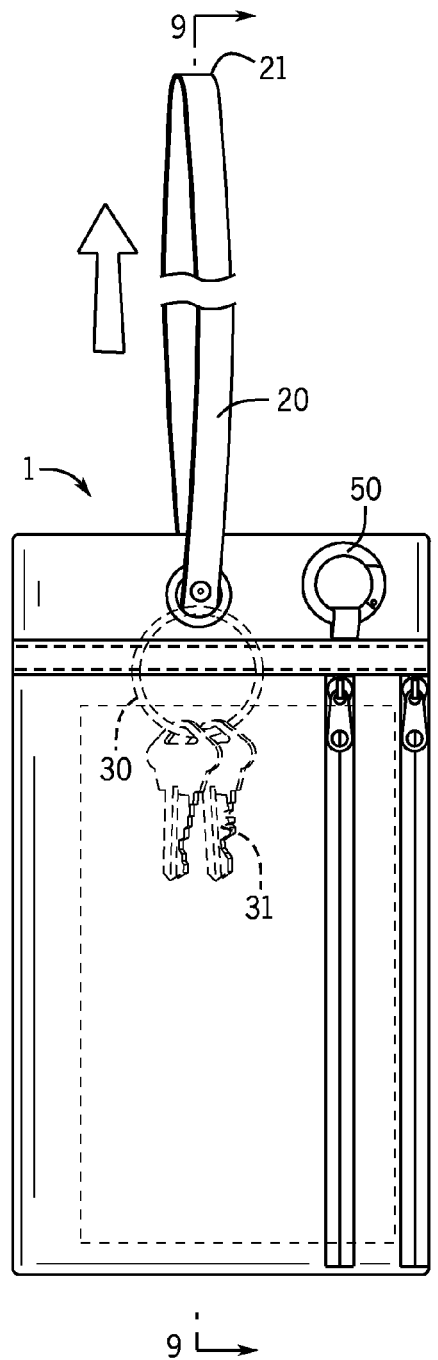
FIG. 5
FIG. 6

KEY HOLDER—CELL PHONE HOLDER COMBINATION

CROSS REFERENCE TO RELATED APPLICATIONS

The following application is based on and claims the priority benefit of U.S. provisional application Ser. No.: 62/030,762 filed Jul. 30, 2014; the entire contents of which are incorporated by reference.

BACKGROUND OF THE INVENTION

A key holder cell phone holder/case combination is provided. The key holder cell phone holder has a looped strap having a first end and a second end wherein the first end passes through a first and a second central opening on the main body of the cell phone holder. The looped strap is secured to a standard key ring on the second end. When the first end of the looped strap is pulled away from the main body of the cell phone holder, the second end having the standard ring key and keys is pulled inward, toward an interior pocket of the cell phone holder. A plurality of pockets located on the cell phone holder allow for storing money, IDs, credit cards and other personal items.

Attempts have been made to provide cell phone holders which secure keys. For example, U.S. Pat. No.: 5,833,054 to Graves discloses a key case which allows for the exclusive selection of individual keys. The case has a plurality of compartments capable of holding one or two keys. The compartments may be zippered or have an access door. In a first embodiment the main body of the case is made out of leather or fabric. Each key compartment is accessed by way of a zipper which allows for the keys to be selectively available for manipulation by the user. In another embodiment the case is rigid and has an access door for each compartment. Opening the access door allows access to the keys. In both embodiments the key is attached to the interior of the key compartments by a relatively long chain which allows the user to use the key while the key case is still attached to the users belt, purse, etc. The case is provided with a velcro patch which allows it to be secured to vertical surfaces such as the dashboard of an automobile.

Further, U.S. Pat. No.: 5,363,680 to Wu discloses a structure for key chain, having a main body having a thread at the upper end to enable it to be screwed onto the bottom end of a fixed seat, and the main body further having a chamber therein for receiving a disk spring and a top ring that is inserted onto the main body, and the disk spring is held with a conical body on the bottom of the top ring, and a key fastener held by the disk spring is then inserted. When the key fastener is intended for removal, pushing up the top ring will cause the conical body on the bottom of the top ring to prop open the sheet cones of the disk spring, and the key fastener can be removed.

Still further, U.S. Pat. No.: 6,237,756 to Caudle discloses a device for storing conventional keys in a flat panel for carrying in a person's pants pocket or purse. Each key is stored in a flat slot extending from one edge of the panel. A push-button on the panel can be moved along the panel surface to push the key out of the panel or to pull the key into the panel. The push-button is attached to the key by a flexible connector that has a lost motion connection to the push-button. The lost motion connection allows the key to be spaced from the panel so as to be manipulatable without interference from the panel.

However, these patents fail to disclose a device for securing holding and carrying keys in combination with a cell phone holder. Further, these patents lack a key holder cell phone holder combination which is easy to use and efficient. Accordingly, a need exists for improved key holder cell phone holder.

SUMMARY OF THE INVENTION

A key holder cell phone holder combination is provided. The key holder cell phone holder has a looped strap having a first end and a second end wherein the first end passes through a first and a second central opening on the main body of the cell phone holder. The looped strap is secured to a standard key ring on the second end. When the first end of the looped strap is pulled away from the main body of the cell phone holder, the second end having the standard ring key and keys is pulled inward, toward an interior pocket of the cell phone holder. A plurality of pockets located on the cell phone holder allow for storing money, IDs, credit cards and other personal items.

An advantage of the present key holder cell phone holder (or "case") combination is that the present key holder cell phone holder combination may allow a user to securely carry his or her keys.

Another advantage of the present key holder cell phone holder combination is that the present key holder cell phone holder combination may allow a user to carry his or her keys outside of a purse so as to not scratch his or her phone while still securing the keys to the cell phone holder.

Yet another advantage of the present key holder cell phone combination is that the present device may have magnets for securing the keys within the device.

An advantage of the present key holder cell phone holder combination is that the device is light weight and easily transported.

Still another advantage of the present key holder cell phone holder combination is that the present key holder cell phone holder combination may have a looped strap which moves from a first position to a second position wherein in the second position the keys secured to the key ring are automatically moved within an interior pocket of the purse.

Yet another advantage of the present key holder cell phone holder combination is that the present key holder cell phone holder combination may have numerous pockets for securing money, IDs, credit cards and other personal items.

And still another advantage of the present key holder cell phone holder combination is that the present key holder cell phone holder combination may be securely carried around the wrist of the person carrying the device.

Another advantage of the present key holder cell phone holder combination is that the looped strap of the device may be secured to a loop of a belt for carrying.

For a more complete understanding of the above listed features and advantages of the present key colder cell phone holder combination reference should be made to the following detailed description of the preferred embodiments and to the accompanying drawings.

BRIEF DESCRIPTION OF THE DRAWING

FIG. 1 illustrates a front perspective view of a person carrying the key holder cell phone holder combination.

FIG. 2 illustrates front perspective view of the key holder cell phone holder combination.

FIG. 3 illustrates a front perspective view of the key holder cell phone holder combination wherein the looped strap portion is in the first orientation.

FIG. 4 illustrates a front perspective view of the key holder cell phone holder combination wherein the looped strap portion is in the second orientation and the keys are visible within the interior pocket of the main body.

FIG. 5 illustrates a front perspective view of the key holder cell phone holder combination wherein the looped strap portion is in the first orientation.

FIG. 6 illustrates a front perspective view of the key holder cell phone holder combination wherein the looped strap portion is in the second orientation and the keys are visible within the interior pocket of the main body.

DETAILED DESCRIPTION OF THE PREFERRED EMBODIMENTS

Figure 7:
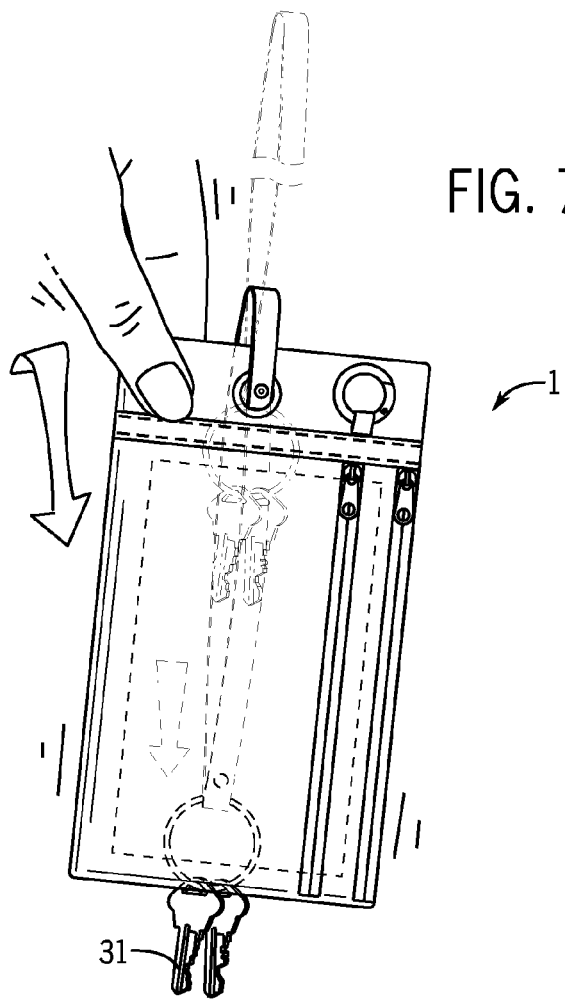
FIG. 7 illustrates a perspective view of the movement of the looped strap portion of the key holder cell phone holder combination.
Figure 10:
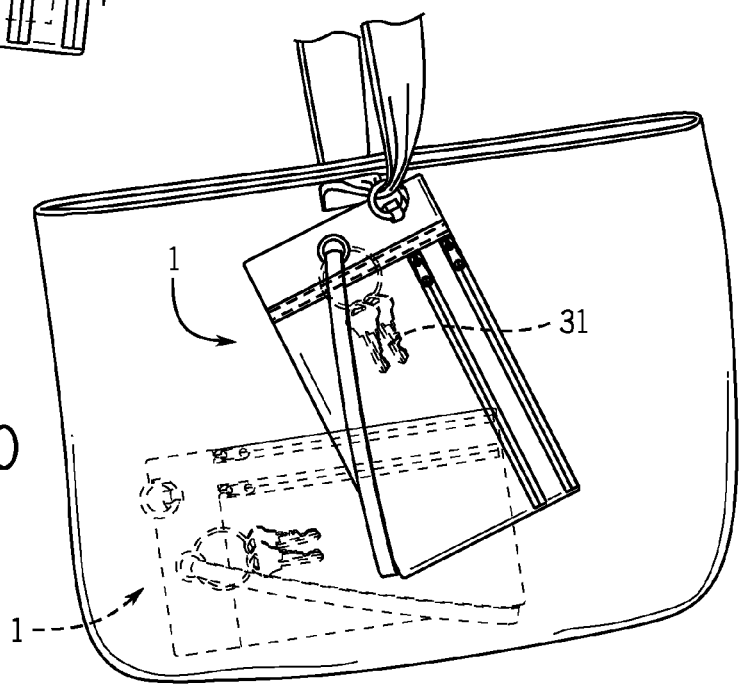
FIG. 10 illustrates a view of the key holder cell phone holder combination secured within a larger purse.

A key holder cell phone holder combination is provided. The key holder cell phone holder has a looped strap having a first end and a second end wherein the first end passes through a first and a second central opening on the main body of the cell phone holder. The looped strap is secured to a standard key ring on the second end. When the first end of the looped strap is pulled away from the main body of the cell phone holder, the second end having the standard ring key and keys is pulled inward, toward an interior pocket of the cell phone holder. A plurality of pockets located on the cell phone holder allow for storing money, IDs, credit cards and other personal items.

Referring first to FIGS. 1 and 2, in an embodiment, a key holder cell phone holder combination 1 is provided. The key holder cell phone holder combination 1 may have a top 2, a bottom 3, a front 4, a back 5, a first side 6, a second side 7, and a generally hollow main interior pocket 8. Preferably, the key holder cell phone holder combination 1 is made of a durable material such as plastic, leather, cloth or the like. In an embodiment, the device 1 may be generally rectangular and generally flat. Further, the key holder cell phone holder combination 1 may be generally constructed of two layers (a first layer 15A and a second layer 15B) wherein the generally hollow main interior pocket 8 is located between the first layer 15A and the second layer 15B. The first layer 15A and the second layer 15B may be secured together along the entire top 2 of the main body of the device 1, but may be not secured along the bottom 3 of the device 1 so that there is only one main opening into the generally hollow main interior pocket 8 (through the bottom 3).

Figure 8:
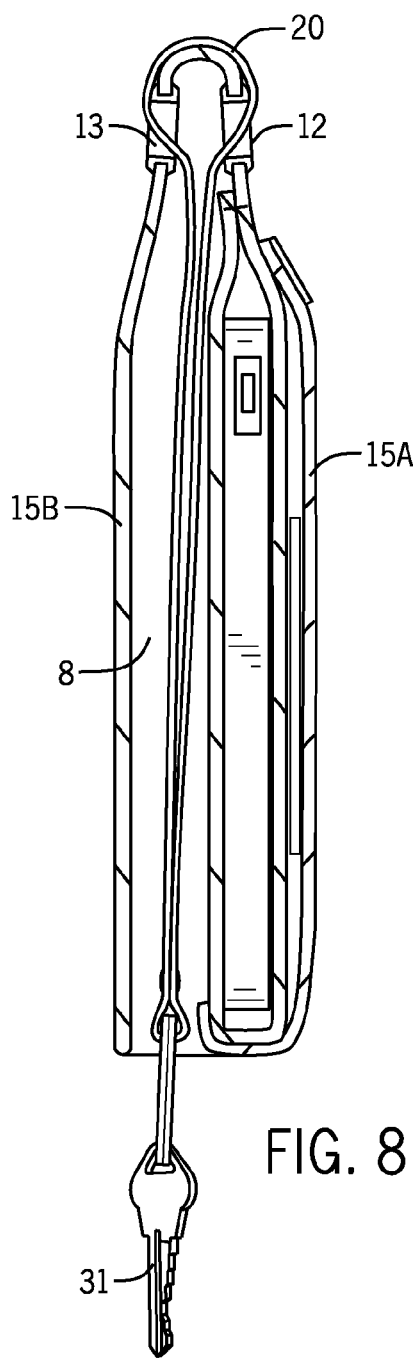
FIG. 8 illustrates a side view of the key holder cell phone holder combination wherein the looped key portion is in the first orientation.
Figure 9:
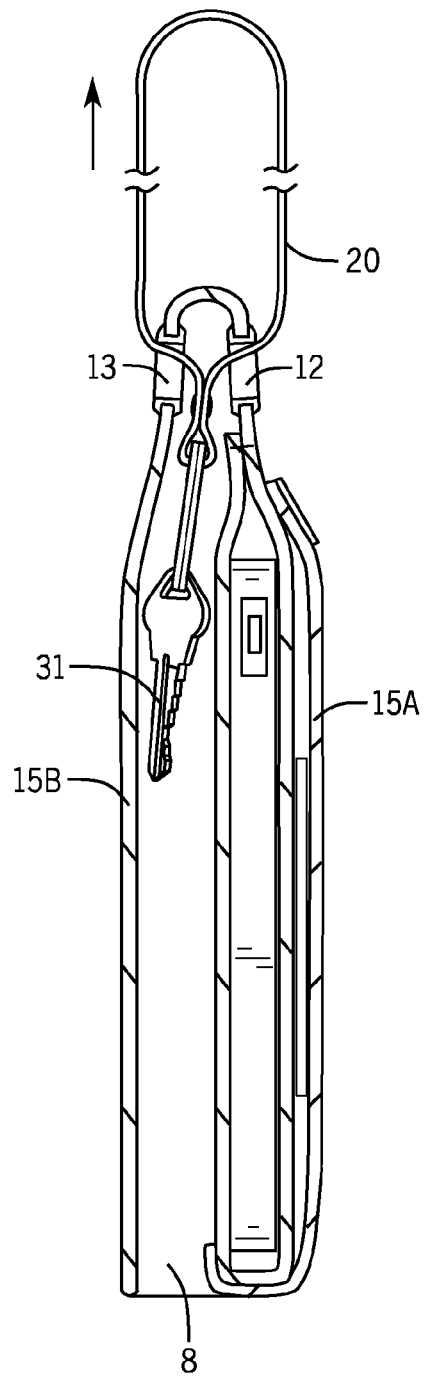
FIG. 9 illustrates a side view of the key holder cell phone holder combination wherein the looped key portion is in the second orientation.

In an embodiment, the front 4 of the key holder cell phone holder combination 1 may have a first generally circular opening 10. More specifically, the first generally circular opening 10 may be located near the top 2 of the main body of the device 1. The first generally circular opening 10 may be surrounded by a metal or plastic grommet 11. The first generally circular opening 10 may have a diameter 12 (FIG. 4). The first generally circular opening 10 may extend completely through the first layer 15A. A second generally circular opening 13 (FIGS. 8 and 9) may completely extend through the second layer 15B. Preferably, the first generally circular opening 12 and the second generally circular opening 13 may be mirror images of each other and located adjacent to each other.

Referring now to FIGS. 5 and 6, in an embodiment, a strap or lanyard 20 may be used in connection with the key holder cell phone holder combination 1. The strap or lanyard 20 may have a first end 21, a second end 22 and a width 23 wherein the width 23 of the strap or lanyard 20 is slightly less than the diameter 12 of the first and second generally circular openings 10, 13. As a result, the strap or lanyard 20 may snugly slide partially through the first and second generally circular openings 10, 13. Preferably, the strap or lanyard 20 is made from, for example, plastic, leather, cloth or the like and is generally flexible. Further, the strap or lanyard 20 may be generally loop-shaped which doubles up into two elongated sections when flattened. Located on the second end 22 of the strap or lanyard 20 may be a standard key ring 30. The standard key ring 30 may receive a plurality of keys 31.

In an embodiment the strap or lanyard 20 may move from a First Orientation "A" (FIG. 3) to a Second Orientation "B" (FIG. 4). In particular, a user may grasp the first end 21 of the strap or lanyard 20 when the strap or lanyard 20 is in the First Orientation "A". As the user pulls the first end 21 of the strap or lanyard 20, the strap or lanyard 20 may move with respect to the main body of the device 1. More specifically, the strap or lanyard 20 may move partially through the first and second generally circular openings 10, 13 of the front 4 and back 5 of the key holder cell phone holder combination 1. At the same time the first end 21 of the strap or lanyard 20 moves away from the main body of the device 1, the main body of the strap or lanyard 20 moves through the generally hollow main interior pocket 8. As a result, keys 31 located on the key ring 30 are pulled toward the generally hollow main interior pocket 8 and end up within the generally hollow main interior pocket 8.

In an embodiment, located on, for example, the front 4 of the main body of the key holder cell phone holder combination 1 may be a zipper 40 opening into a pocket 41. In an embodiment, the pocket 41 may be transparent therein allowing a user to view the contents of the pocket 41 without opening the pocket 41. The pocket 41 may be located completely within the interior of the first layer 15A and/or second layer 15B. The pocket 41 may be a separate compartment from the generally hollow main interior pocket 8 such that the keys 31 located within the generally hollow main interior pocket 8 (when the device 1 is in the Second Orientation "B" of FIG. 4) do not contact items located within the pocket 41 of the device 1. As a result, the items (such as phones, money, credit cards, IDs) located within the pocket 41 are not damaged by the keys 31.

In an embodiment, the front 4 of the main body of the key holder cell phone holder combination 1 may have a securing loop 50 (FIG. 2). The securing loop may allow a user to pull the strap or lanyard 20 into the Second Orientation "B" (FIG. 4) and then to secure the first end 21 of the strap or lanyard 20 through the securing loop 50 forming a closed loop for the strap or lanyard 20. As a result, a user may secure the device through, for example, a belt loop, to avoid having to carry the device 1 with his or her hands.

Figure 11:
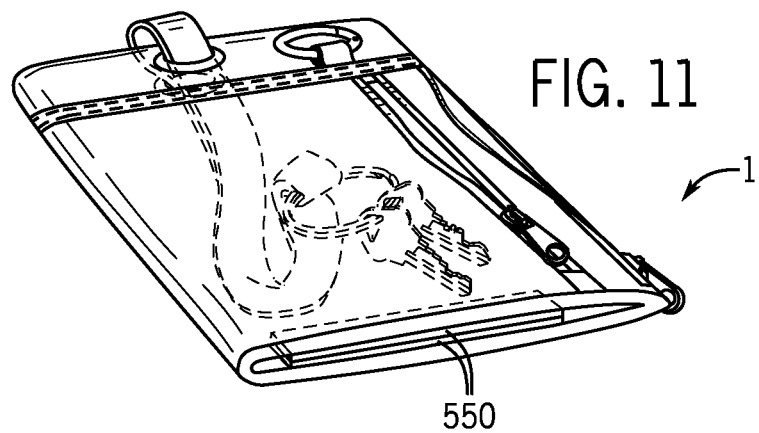
FIG. 11 illustrates an embodiment wherein the bottom of the device has a magnet for securing keys within the interior of the device.

Referring now to FIG. 11, in an alternative embodiment, a plurality of magnets 550 may be located at the bottom 3 of the main body of the device 1; specifically, one magnet located within the first layer 15A and a corresponding magnet located within the second layer 15B. In this embodiment, the plurality of magnets 550 may allow the first layer 15A and second layer 15B to be temporarily secured together with the keys 31 and second end 22 of the strap or lanyard 20 completely secured with the in interior 8 of the device 1.

Figure 12:
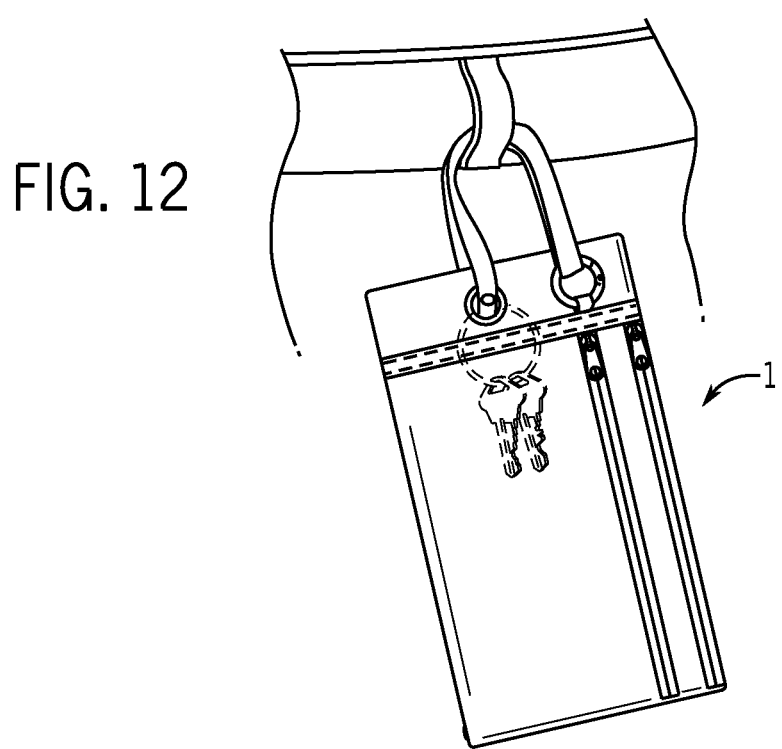
FIG. 12 illustrates the device being secured to a belt loop.

Referring now to FIG. 12, in an embodiment, the strap or lanyard 20 may be secured within a belt loop. In particular, the second end 22 of the strap or lanyard 20 may be temporarily secured by the securing loop 50 of the front 4 of the device 1. Finally, referring now to FIG. 3, in an embodiment, a rivet 549 may be attached to the strap or lanyard 20. The rivet 549 may prevent the standard key chain 30 from moving away from the second end 22 of the strap or lanyard 20.

Although embodiments of the present invention are shown and described therein, it should be understood that various changes and modifications to the presently preferred embodiments will be apparent to those skilled in the art. Such changes and modifications may be made without departing from the spirit and scope of the present invention and without diminishing its attendant advantages. It is, therefore, intended that such changes and modifications be covered by the present application.

The invention claimed is:

1. A key holder cell phone holder combination comprising:
   a housing having a first layer having an opening and a second layer wherein the first layer defines a front and the second layer defines a back of the housing;
   a first side, a second side, a top, and a bottom of the housing,
   a generally hollow interior between the first layer and the second layer of the housing;
   a bendable lanyard having a first end portion, a middle portion and a second end portion wherein a portion of the middle of the bendable lanyard passes through the opening of the first layer of the housing; and
   a key chain secured to the second end portion of the bendable lanyard wherein the key chain moves from a first position located outside of the hollow interior of the housing to a second position located at least partially within the hollow interior of the housing when the first end of the bendable lanyard is pulled away from the housing.

2. The key holder cell phone holder combination of claim 1 further comprising:
   a pocket having an interior for storing an item located within the first layer of the housing.

3. The key holder cell phone holder combination of claim 2 wherein the pocket is transparent.

4. The key holder cell phone holder combination of claim 1 further comprising:
   a first magnet located at the bottom of the housing within the first layer and a corresponding second magnet located at the bottom of the housing within the second layer wherein the first magnet and second magnet temporarily secure the first layer of the housing to the second layer of the housing to close an opening at the bottom of the housing.

5. The key holder cell phone holder combination of claim 1 wherein the bendable lanyard is folded in half; and
   an opening on the second layer of the housing wherein the opening of the second layer of the housing is of the same size as the opening of the first layer of the housing and wherein a portion of the middle of the lanyard passes through both the opening of the first layer of the housing and the opening of the second layer of the housing.

6. The key holder cell phone holder combination of claim 1 further comprising:
   a rivet located at the second end of the bendable lanyard wherein the rivet prevents the key chain from moving away from the second end of the bendable lanyard.

* * * * *